US009718182B2

(12) United States Patent
Azhocar

(10) Patent No.: US 9,718,182 B2
(45) Date of Patent: Aug. 1, 2017

(54) SWIVEL HANDLE ASSEMBLY

(71) Applicant: Frederick Steven Azhocar, San Diego, CA (US)

(72) Inventor: Frederick Steven Azhocar, San Diego, CA (US)

(*) Notice: Subject to any disclaimer, the term of this patent is extended or adjusted under 35 U.S.C. 154(b) by 0 days.

(21) Appl. No.: 14/710,571

(22) Filed: May 12, 2015

(65) Prior Publication Data
US 2016/0332290 A1 Nov. 17, 2016

(51) Int. Cl.
| F41C 23/00 | (2006.01) |
| B25G 3/38 | (2006.01) |
| B25G 3/36 | (2006.01) |
| F41C 23/16 | (2006.01) |
| F41C 23/14 | (2006.01) |
| F16M 11/14 | (2006.01) |

(52) U.S. Cl.
CPC ............... *B25G 3/38* (2013.01); *B25G 3/36* (2013.01); *F16M 11/14* (2013.01); *F41C 23/14* (2013.01); *F41C 23/16* (2013.01)

(58) Field of Classification Search
CPC ... B25G 3/38; B25G 3/36; F41C 23/16; F41C 23/14; F16M 11/14
USPC .............................................................. 42/73
See application file for complete search history.

(56) References Cited

U.S. PATENT DOCUMENTS

| 86,173 | A | * | 1/1869 | Maynard | F16C 11/0661 |
| | | | | | 108/1 |
| 807,857 | A | * | 12/1905 | Palmenberg | F16C 11/0614 |
| | | | | | 211/33 |
| 1,333,432 | A | * | 3/1920 | Maier | B23Q 1/545 |
| | | | | | 248/289.11 |
| 1,532,195 | A | * | 4/1925 | Morrison | F16L 27/073 |
| | | | | | 285/261 |
| 1,894,456 | A | * | 1/1933 | Zerk | F16M 11/10 |
| | | | | | 248/181.1 |
| 2,464,500 | A | * | 3/1949 | Graham | F16M 11/10 |
| | | | | | 248/181.1 |
| 2,670,228 | A | * | 2/1954 | Pagliuso | F16M 11/14 |
| | | | | | 248/177.1 |
| 2,928,686 | A | * | 3/1960 | Newkirk | B23Q 1/28 |
| | | | | | 248/181.1 |
| 3,319,982 | A | * | 5/1967 | Schwartz | F16C 11/106 |
| | | | | | 277/507 |
| 3,575,369 | A | * | 4/1971 | Tetlow | F16M 13/04 |
| | | | | | 248/158 |
| 3,632,073 | A | * | 1/1972 | Nakatani | F16M 11/14 |
| | | | | | 248/169 |
| 4,020,577 | A | | 5/1977 | Duffy | |

(Continued)

*Primary Examiner* — Michelle R Clement
(74) *Attorney, Agent, or Firm* — Kevin Keener; Keener and Associates P.C.

(57) ABSTRACT

A swivel handle assembly is disclosed. The swivel handle assembly comprises a ball attachment, a handle, and a friction pin. The handle is a hollow elongate cylinder with openings at each end of the handle. The ball attachment fits within the first end of the handle and extends through the first opening. The handle is rotatable around the ball attachment. The friction pin is inserted through the second end of the handle. The friction pin extends through the body of the handle and engages the ball attachment. When the friction pin is fully engaged against the ball attachment the handle is locked into position. The user can position the handle on the ball attachment in a desired position and lock the handle in place during use.

17 Claims, 14 Drawing Sheets

(56) References Cited

U.S. PATENT DOCUMENTS

| | | | | |
|---|---|---|---|---|
| 4,121,799 A * | 10/1978 | Michio | F16M 11/34 | 248/171 |
| 4,438,612 A * | 3/1984 | Bernard | E02D 5/74 | 403/43 |
| 4,520,983 A * | 6/1985 | Templeman | B60R 1/06 | 248/481 |
| 4,570,887 A * | 2/1986 | Banister | F16M 11/02 | 248/187.1 |
| 4,770,382 A * | 9/1988 | Lehti | F16M 11/12 | 248/181.2 |
| 4,974,802 A * | 12/1990 | Hendren | F16C 11/106 | 248/181.1 |
| 4,986,503 A * | 1/1991 | Kabat | B63B 17/00 | 248/181.2 |
| 5,081,782 A * | 1/1992 | Wright | F41A 23/16 | 42/94 |
| 5,194,678 A * | 3/1993 | Kramer | F16M 11/16 | 42/94 |
| 5,417,002 A | 5/1995 | Guerra | | |
| 5,903,995 A * | 5/1999 | Brubach | F41A 23/06 | 42/90 |
| 6,017,010 A * | 1/2000 | Cui | F16C 11/106 | 248/181.1 |
| 6,487,807 B1 * | 12/2002 | Kopman | F41A 23/12 | 42/72 |
| 6,843,015 B2 * | 1/2005 | Sharp | F41A 23/10 | 211/203 |
| 7,021,592 B2 * | 4/2006 | Brandes | F16M 11/14 | 248/178.1 |
| 7,077,582 B2 * | 7/2006 | Johnson | F16M 11/04 | 396/428 |
| 7,191,557 B2 * | 3/2007 | Gablowski | F41C 23/16 | 42/72 |
| 7,434,344 B2 | 10/2008 | Golan | | |
| 7,584,568 B1 * | 9/2009 | Brownlee | F41C 23/16 | 42/94 |
| 7,614,174 B1 * | 11/2009 | Beltz | F41A 23/10 | 42/72 |
| 7,698,847 B2 * | 4/2010 | Griffin | F41C 23/16 | 42/71.01 |
| 7,793,454 B1 * | 9/2010 | Beltz | F41A 23/10 | 42/72 |
| 7,891,887 B1 * | 2/2011 | Wu | G03B 17/00 | 248/178.1 |
| 8,267,361 B1 * | 9/2012 | Dordick | F16M 11/14 | 248/178.1 |
| 8,413,398 B1 * | 4/2013 | Allred | F16G 11/06 | 248/181.1 |
| 8,424,823 B2 * | 4/2013 | Fadler | A61B 8/0825 | 248/181.1 |
| 8,474,169 B2 | 7/2013 | Cottle et al. | | |
| 8,753,031 B2 * | 6/2014 | Stefan | A61B 90/50 | 248/181.1 |
| 8,820,210 B2 | 9/2014 | Melville | | |
| 8,904,693 B1 * | 12/2014 | Beltz | F41A 23/10 | 42/72 |
| 8,910,407 B2 | 12/2014 | Singh | | |
| 8,960,066 B2 | 2/2015 | Gomez | | |
| 9,206,941 B2 * | 12/2015 | Smith | F16M 11/04 | |
| 9,303,940 B2 * | 4/2016 | Bonelli | F16M 11/14 | |
| 2003/0192223 A1 * | 10/2003 | Sharp | F41A 23/10 | 42/94 |
| 2004/0144010 A1 | 7/2004 | Golan | | |
| 2005/0151040 A1 * | 7/2005 | Hsu | B62J 11/00 | 248/214 |
| 2005/0207749 A1 * | 9/2005 | Barker | F16M 11/14 | 396/428 |
| 2005/0241206 A1 * | 11/2005 | Teetzel | F41C 23/16 | 42/72 |
| 2005/0242250 A1 * | 11/2005 | Keng | F16M 11/10 | 248/168 |
| 2006/0150467 A1 * | 7/2006 | Poulin | F41A 11/02 | 42/71.02 |
| 2008/0072471 A1 * | 3/2008 | Keng | F41G 11/003 | 42/124 |
| 2009/0126250 A1 * | 5/2009 | Keng | F41A 23/10 | 42/94 |
| 2009/0193702 A1 * | 8/2009 | Lin | F41C 23/16 | 42/72 |
| 2009/0241396 A1 | 10/2009 | McManus | | |
| 2009/0313873 A1 * | 12/2009 | Roth | F41C 23/16 | 42/72 |
| 2010/0146836 A1 * | 6/2010 | Moody | F41C 23/16 | 42/72 |
| 2010/0212203 A1 * | 8/2010 | McGarry | F41C 23/14 | 42/71.02 |
| 2012/0042730 A1 * | 2/2012 | Johnson | G01M 7/027 | 73/579 |
| 2013/0193288 A1 * | 8/2013 | Congdon | F16M 11/14 | 248/231.41 |
| 2014/0013641 A1 | 1/2014 | Warburton et al. | | |
| 2014/0053447 A1 | 2/2014 | Singh | | |
| 2014/0082987 A1 * | 3/2014 | Boll | A01M 31/02 | 42/94 |
| 2014/0115940 A1 * | 5/2014 | Bonelli | F16M 11/14 | 42/94 |
| 2015/0023656 A1 * | 1/2015 | Moody | F41A 23/08 | 396/428 |
| 2015/0121741 A1 * | 5/2015 | Bowman | F41A 23/10 | 42/94 |

* cited by examiner

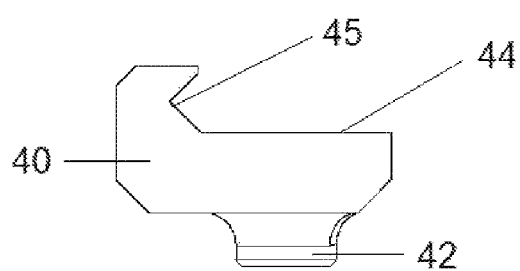
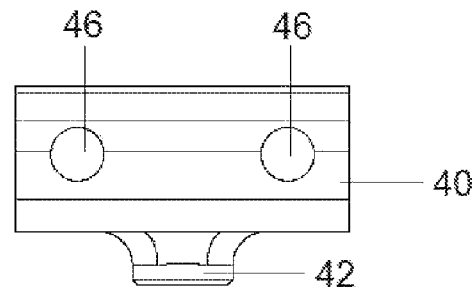
FIG. 7A  FIG. 7B
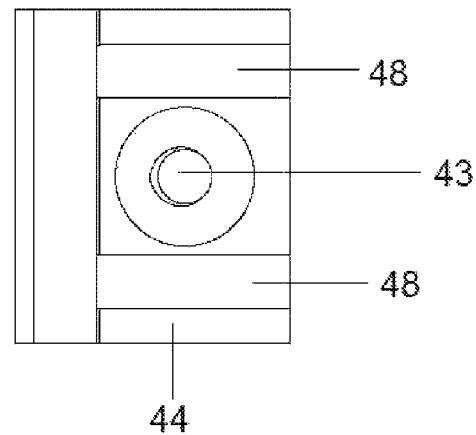
FIG. 7C

SWIVEL HANDLE ASSEMBLY

FIELD OF INVENTION

This invention relates to handles for devices and more specifically to a swivel handle assembly with a full rotational range of motion configured to be locked in a user specific position.

BACKGROUND OF INVENTION

The invention is directed toward a swivel handle assembly. As originally conceived the swivel handle assembly was intended for use on assault rifles. The disclosure will be written with firearms as the central focus of the utilization for the swivel handle assembly. However, it should be recognized that the firearm may be interchangeable with any tool or device and the description of the use of the swivel handle assembly on a firearm should not be seen as limiting the scope of the invention but rather as being illustrative of the use of the swivel handle assembly on a tool.

Standard assault rifles are configured to be held with both hands of a user. One hand of a user is placed on grip handle and the user can pull the trigger. The user can then utilize the non-trigger hand to hold the extended fore part of the gun. Normally, the user can support the fore part of the gun by placing the non-trigger hand under the rail section of the rifle. The rail section is configured such that additional elements and components may be attached to the rail for utilization by the user. One such additional component which a user can add on is a handle for use in the fore section of the rifle.

Standard handles which may be added to the rail are normally static, in that the handle is always extended downward from the rail in an unmovable position. Moveable handles were then implemented. These moveable handles extended downward from the rail section but could be flipped upward, in-line with the barrel, when not in use. These standard handles though are highly limited. They only provide one or two positions for users—either fully up or fully down. Additionally, these handles are only positionable in-line with the barrel of the rifle. These limitations do not take into account the preferences of the user who may want the handle in an out of line position or at a customizable angle. What is needed is a swivel handle for a firearm which is provides a full scope of rotation for the user and may be locked into any position chosen by the user.

The same problem is encountered through the use of other tools utilizing handles. Most handles on tools are fixed in a set position without regard for user preference as to the angle of the handle. What is needed for these tools is a swivel handle providing a full scope of rotation which may be locked into a position chosen by the user.

SUMMARY OF INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The invention is directed to a movable handle assembly comprising a ball attachment, a handle, and a friction pin. The ball attachment is a generally spherical ball with a connection member extending radially from the generally spherical ball. The handle is a substantially cylindrical elongate member having a first end and a second end. The handle has an internal cavity extending from the first end to the second end. The first end has an internal threading on the inner circumference of the internal cavity. The first end has a first end opening and a second end opening, which are substantially circular in shape. The friction pin has a substantially cylindrical member terminating in a first end and a second end. The friction pin comprises a grip and an external threading. The grip is located at the second end of the friction pin and extends radially from the outer circumference of the friction pin. The external threading extending radially from the outer circumference of the friction pin, the external threading located proximal to the second end of the friction pin and distal to the first end of the friction pin. The generally spherical ball of the ball attachment is located within the internal cavity of the handle and proximate to the second end of the handle with the connection member extending through the second end opening of the handle. The connection member is movable within the second end opening of the handle. The substantially cylindrical member of the friction pin extends through the internal cavity of the handle such that the first end of the friction pin is proximate to the generally spherical ball of the ball attachment. The friction pin may be rotated axially within the internal cavity of the handle. When the external threading of the friction pin engages the internal threading of the handle when the friction pin is rotated axially, the friction pin moves along the longitudinal axis of the handle. The first end of the friction pin may contact the generally spherical ball with sufficient force to lock the handle in a fixed position on the ball attachment.

In another embodiment of the handle assembly, the handle further comprises a notch extending longitudinally from the second end opening toward the first end of the handle. Additionally the first end of the friction pin may comprise a substantially hemispherical depression. The handle assembly may further comprise a polymeric sleeve encircling the outer circumference of the handle. In another embodiment, the handle has a plurality of circular ridges on the external circumference of the handle. In another embodiment of the handle assembly, the connector member of the ball attachment is a substantially cylindrical member having two planar recesses positioned on substantially opposite sides of the connector member.

In another embodiment, the handle assembly may further comprise an end cap which may be removably secured to the friction pin. The end cap is a substantially cylindrical member terminating in a first end and a second end. The end cap comprises a grip, an external threading, and an internal cavity. The grip is located at the second end of the end cap and extending radially from the outer circumference of the friction pin. The external threading, located at the first end of the end cap, extends radially from the outer circumference of the end cap. The internal cavity extends longitudinally from the first end of the end cap into the body of the end cap. In this embodiment the friction pin further comprises an internal cavity. The internal cavity of the friction pin extends longitudinally from the second end of the friction pin, the internal cavity having an internal threading complementary to the external threading of the end cap.

In another embodiment of the invention the handle assembly is configured for placement on a firearm and further comprises a clamp base and a clamp. The clamp base has a top side and a bottom side. The bottom side has a ball attachment receiver, which has a central opening for receiving the connection member of the ball attachment. The top side of the clamp base has one or more bolt receptors passing transverse to the longitudinal axis of the clamp base and configured to receive one or more bolts. The top side of the clamp base has an upper member extending along the longitudinal edge of the clamp base, with a notch extending within the upper member and extending longitudinally in the upper member. The upper member has one or more bolt receptor holes configured for receiving one or more bolts. The top side of the clamp base has a central recess configured for receiving a threaded nut. The clamp has a longitudinal recess located between a top longitudinal ridge and a bottom longitudinal ridge. The clamp has one or more holes in the body of the clamp configured to receive one or more bolts.

In another embodiment the connection member has an external threading. The central opening of the clamp base has an internal thread which is complementary to the external threading of the connection member. The handle assembly may further comprise one or more bolts for removably securing the clamp to the clamp base. The handle assembly may further comprise a threaded nut, which may be removably secured to the external threading of the connection member.

BRIEF DESCRIPTION OF THE DRAWINGS

Various exemplary embodiments of this invention will be described in detail, wherein like reference numerals refer to identical or similar components, with reference to the following figures, wherein:

FIG. 7A is a side view of the clamp base;
FIG. 7B is a side view of the clamp base;
FIG. 7C is a top view of the clamp base.

DETAILED DESCRIPTION OF THE PREFERRED EMBODIMENT

Figure 1:
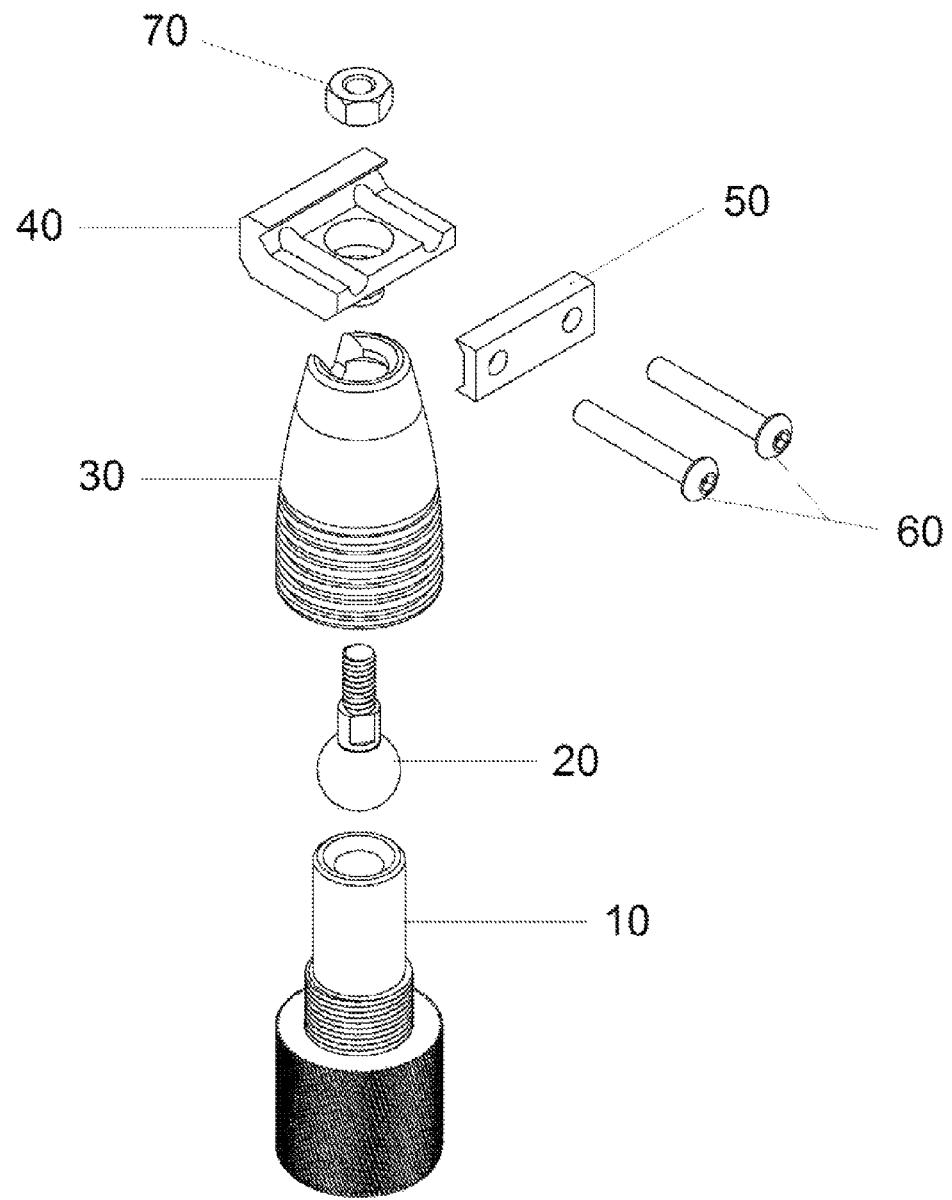
FIG. 1 is an exploded view of the swivel handle assembly.
Figure 2:
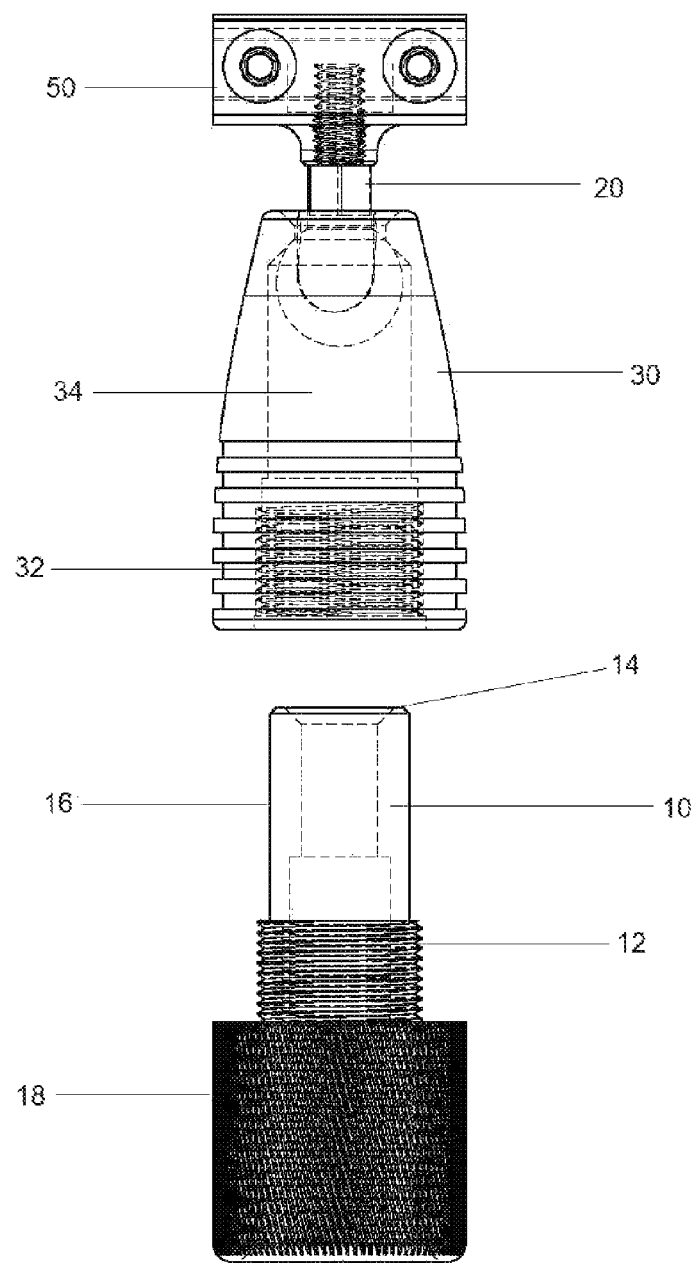
FIG. 2 is a side view of the swivel handle assembly.
Figure 3:
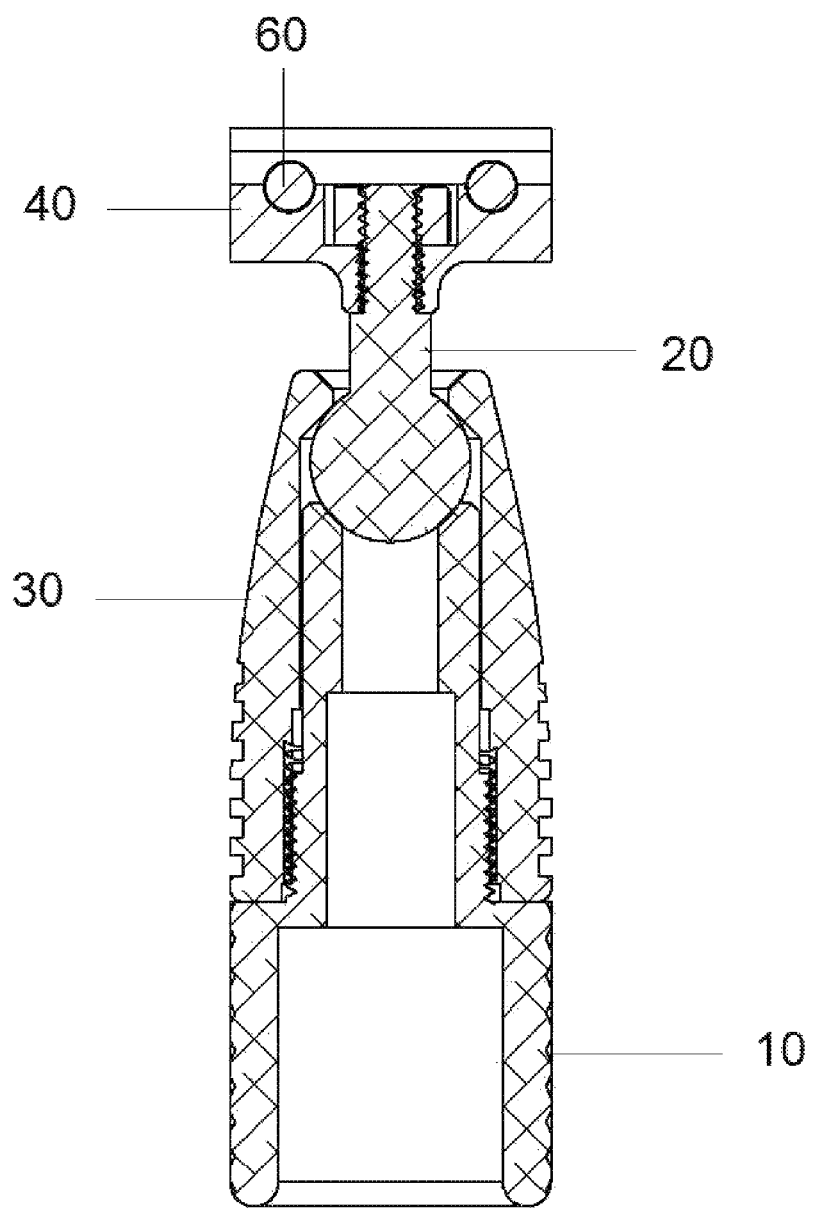
FIG. 3 is a cutaway side view of the swivel handle assembly.
Figure 4:
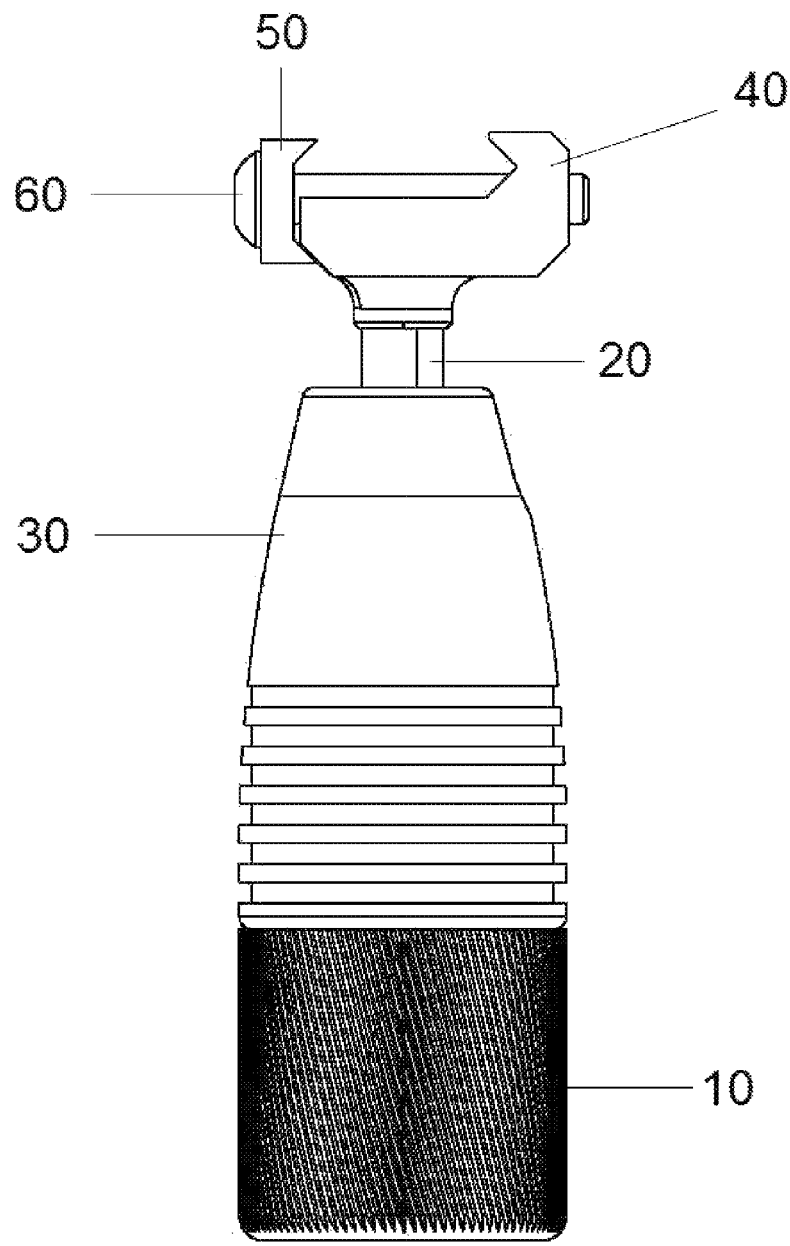
FIG. 4 is a side view of the swivel handle assembly.
Figure 5:
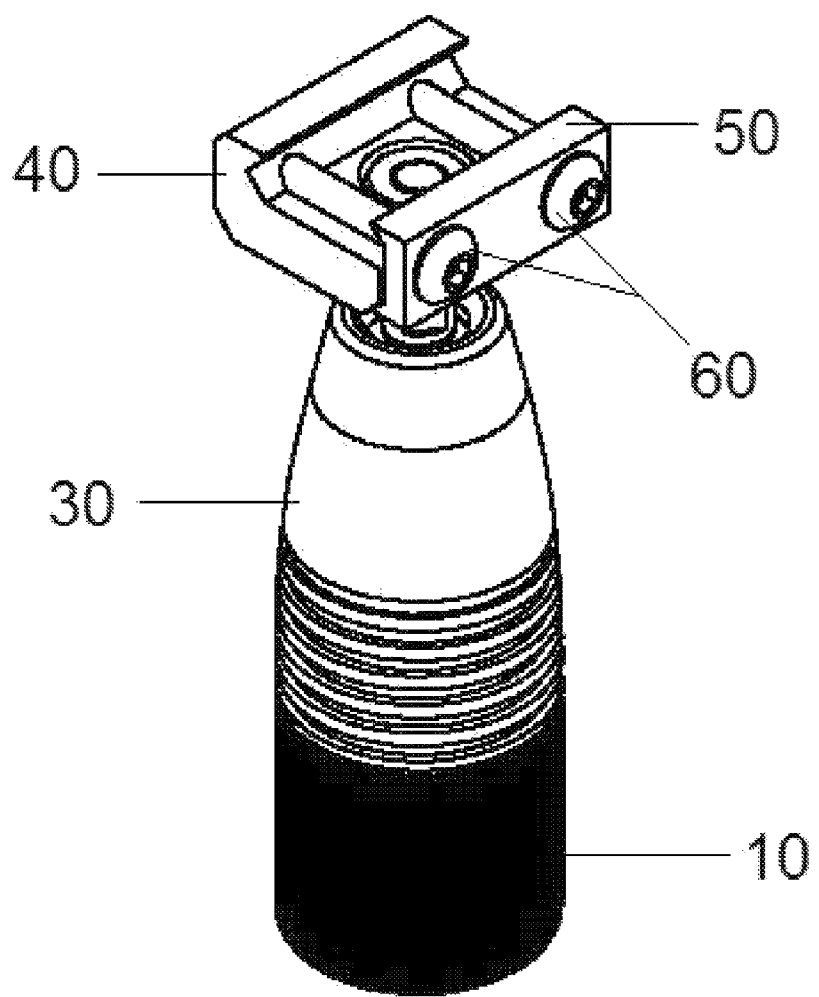
FIG. 5 is a top perspective view of the swivel handle assembly.

The claimed subject matter is now described with reference to the drawings. In the following description, for purposes of explanation, numerous specific details are set forth in order to provide a thorough understanding of the claimed subject matter. It may be evident, however, that the claimed subject matter may be practiced with or without any combination of these specific details, without departing from the spirit and scope of this invention and the claims. After reading this description it will become apparent to one skilled in the art how to implement the invention in various alternative embodiments and alternative applications. However, all the various embodiments of the present invention will not be described herein. It is understood that the embodiments presented here are presented by way of an example only, and not limitation. As such, this detailed description of various alternative embodiments should not be construed to limit the scope or breadth of the present invention as set forth below.

Referring to FIG. 1 through FIG. 5, the preferred embodiment of the swivel handle assembly is displayed. The swivel handle assembly comprises a friction pin 10, a ball attachment 20, a handle 30, a clamp base 40, a clamp 50, one or more bolts 60, and a nut 70. The clamp base 40, clamp 50, and one or more bolts 60 provide a means for attaching the swivel handle assembly to the rail of a firearm. The ball attachment 20 is secured to the base clamp 40 with the nut 70. The handle 30 is freely connected to the ball attachment 20 at one end. The handle 30 can swivel and tilt into any position and angle on the ball attachment 20. When the handle 30 is placed in the desired position the user engages the friction pin 10. The friction pin 10 enters the opposite end of the handle 30 from the ball attachment. The friction pin 10 engages the ball attachment 20 to prevent the handle 30 from being rotated to a new position. When the friction pin 10 is engaged the central shaft 16 of the friction pin 10 extends through the internal cavity 34 of the handle 30. The ball receiver 14 freely contacts the ball attachment 20. The internal threading 32 of the handle 30 engages the external threading 12 of the friction pin 10. When the threading is tightened the top end of the handle 30 is pulled into the ball attachment 20 and the ball receiver 14 of the friction pin 10 is pushed into the ball attachment 20. The force exerted on the ball attachment 20 creates a high frictional force between the handle 30 and the ball attachment 20, essentially "locking" the handle 30 in the desired position.

Figure 6A:
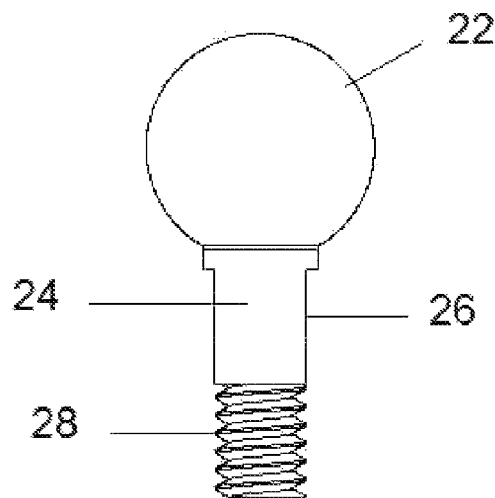
FIG. 6A is a side view of the ball attachment.
Figure 6B:
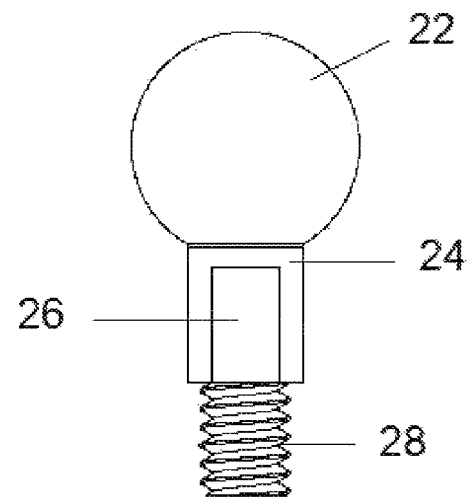
FIG. 6B is a side view of the ball attachment.
Figure 6C:
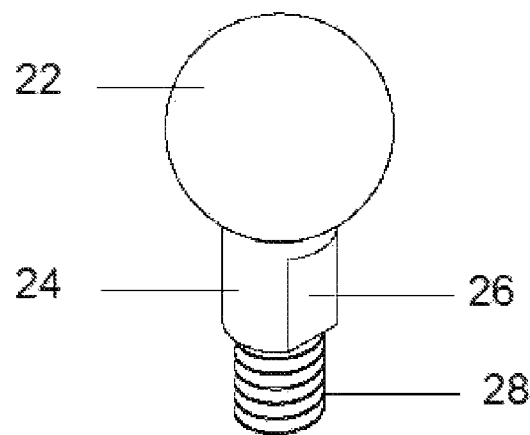
FIG. 6C is a top perspective view of the ball attachment.
Figure 7D:
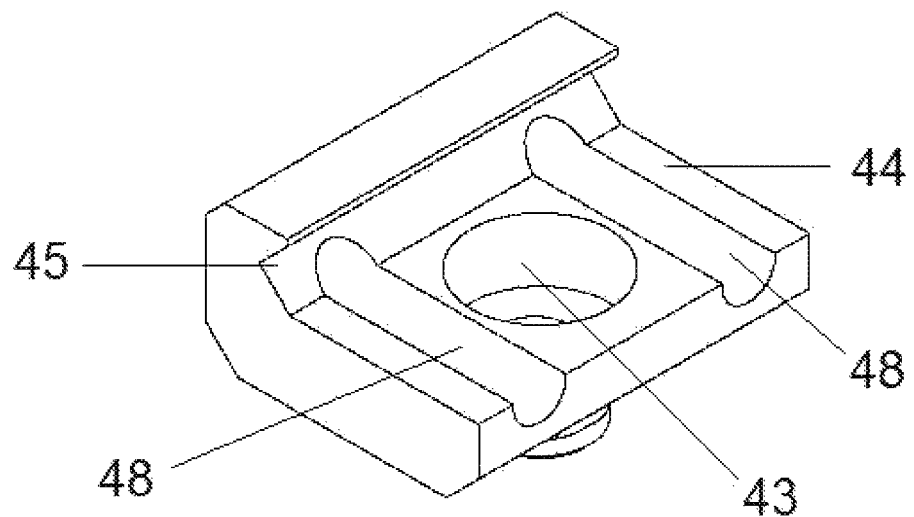
FIG. 7D is a top perspective view of the clamp base.
Figure 7E:
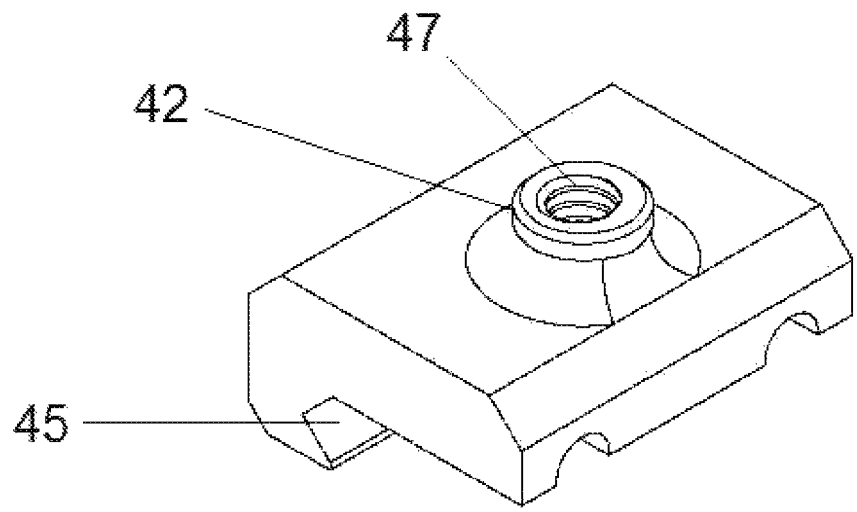
FIG. 7E is a bottom perspective view of the clamp base.
Figure 8A:
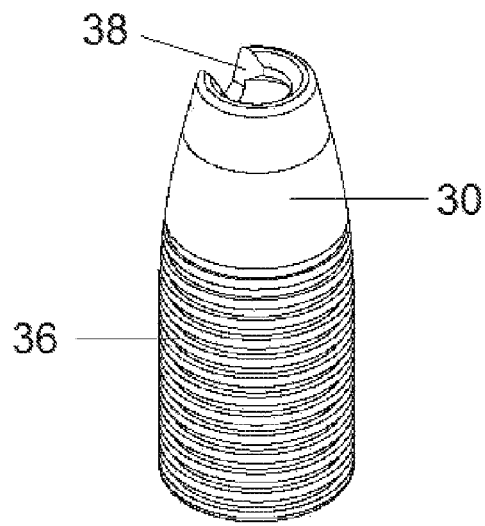
FIG. 8A is a top perspective view of the handle.
Figure 8B:
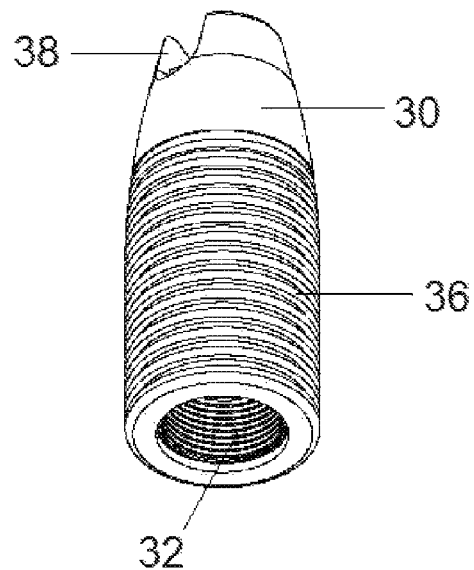
FIG. 8B is a bottom perspective view of the handle.
Figure 8C:
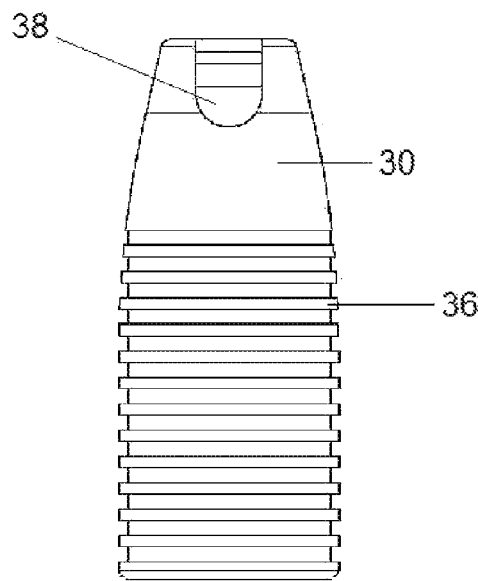
FIG. 8C is a side view of the handle.
Figure 8D:
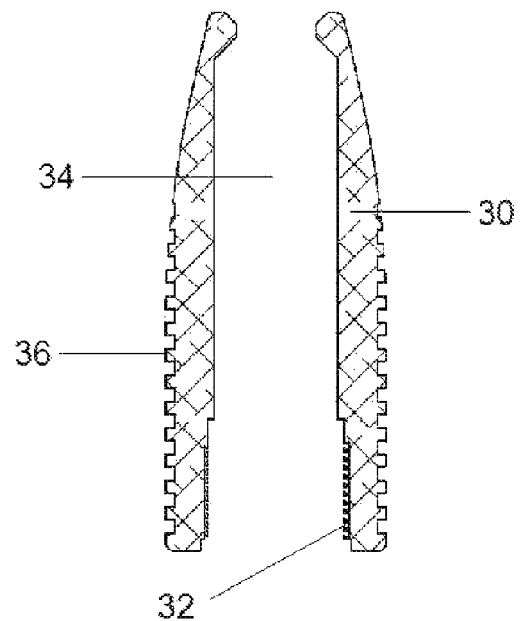
FIG. 8D is a cutaway side view of the handle.

Referring to FIGS. 6A through 6C, the preferred embodiment of the ball attachment 20 is displayed. The ball attachment has a first end with a ball 22. The ball 22 is substantially spherical in shape. The ball 22 is attached to a shaft 24. The shaft 24 is a substantially cylindrical in shape and extends radially from the ball 22. The end of the shaft 24 distal from the ball 22 has external threading 28. The external threading 28 permits the ball attachment 20 to be removably secured to the clamp base 40. The shaft 24 has two planar recesses 26 which are substantially planar and are positioned on opposing sides of the shaft 24 and are substantially parallel to each other.

Referring to FIGS. 7A through 7E, the preferred embodiment of the clamp base 40 is displayed. The clamp base 40 has a top surface 44. The top surface 44 is configured to be positioned against the rail of the firearm. Opposite from the top surface 44 is a receptor 42. The receptor 42 is configured to receive shaft 24 of the ball attachment 20. The receptor 42 has a central opening 43 for receiving the shaft 24 of the ball attachment 20. The central opening 43 has an internal threading 47 which is complementary to the external threading 28 of the ball attachment 20. The external threading 28 of the ball attachment 20 is threaded through the internal threading 47 of the receptor 42 to removably secure the ball attachment 20 to the base clamp 40.

The top surface 44 of the base clamp 40 has a notch 45. The notch 45 runs longitudinally along the top end of the top surface 44. A portion of the clamp base 40 extends vertically above the notch 45. The vertical portion of the base clamp 40 is configured to receive and complement the rail of the firearm. When the clamp 50 is attached to the clamp base 40, the rail is held within the notch 45. The top surface 44 of the clamp base 40 has one or more bolt recesses 48 which traverse the longitudinal length of the clamp base 40. The bolt recesses 48 permit are configured to receive the bolts 60. The bolt recesses 48 terminate in one or more bolt receptors 46. The bolt receptors 46 are configured to receive the bolts 60. The bolt receptors 46 may have threading which the bolts 60 may be threaded into to secure the bolts 60 to the base clamp 40. The top surface 44 of the clamp base 40 has a central recess 43. The central recess 43 is configured to receive the nut 70. The nut 70 has a threading such that the external threading 28 of the ball attachment 20 may be threaded into the nut 70 to secure the ball attachment 20 to the base clamp 40.

Referring to FIGS. 8A through 8D, the preferred embodiment of the handle 30 is displayed. The handle 30 is a hollow elongated member in a substantially cylindrical shape. The handle 30 has a top end and a bottom end. The top end of the handle 30 has a notch 38. The notch 38 is configured to permit the planar recesses 26 to enter the notch 38 so that the handle 30 can be folded upward and in line with the barrel of the rifle. The top end of the handle 30 has a substantially circular opening which is smaller in circumference than the ball 22. The external surface of the lower end of the handle 30 has a plurality of gripping ridges 36. The gripping ridges 36 are circular extensions encircling the outer circumference of the handle 30 to permit a greater frictional grip of the handle by a user. In lieu of the gripping ridges 36, or in addition to the gripping ridges 36, the handle assembly may have a rubber or elastomeric sleeve fitting over the external surface of the handle 30. The handle 30 has a hollow internal cavity 34 extending the length of the handle 30. The lower internal surface of the internal cavity 34 has an internal threading 32. The internal threading 32 is configured to permit the friction pin 10 to be removably secured to the handle 30.

Figure 9A:
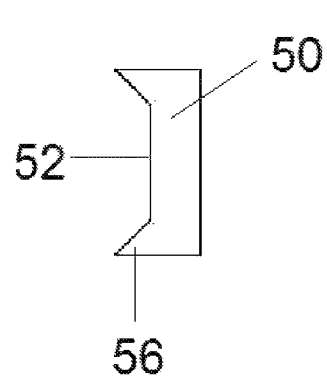
FIG. 9A is a side view of the clamp.
Figure 9B:
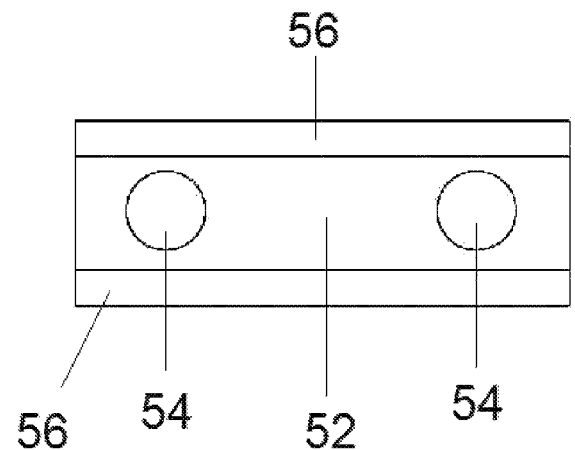
FIG. 9B is a side view of the clamp.
Figure 9C:
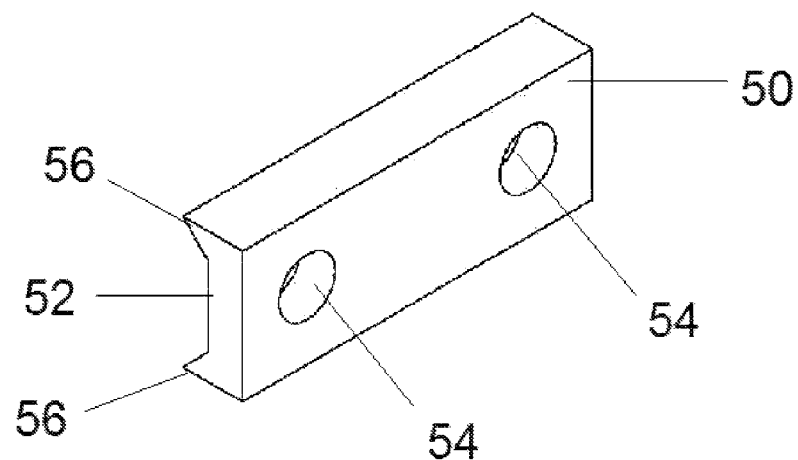
FIG. 9C is a side view of the clamp.

Referring to FIGS. 9A through 9C, the preferred embodiment of the clamp 50 is displayed. The clamp 50 is configured to complement the clamp base 40. The clamp 50 is substantially the same length as the clamp base 40. The clamp 50 has one or more bolt receptors 54. The bolt receptors 54 are circular openings permitting the bolts 60 to pass through to removably secure the clamp 50 to the clamp base 40. The clamp 50 has a recess 52 extending longitudinally on one side of the clamp 50. On each side of the recess 52 is a ridge 56 extending along the length of the clamp 50. The ridges 56 are configured to complement the clamp base 40 and secure the clamp base 40 to the rail. The bolts 60 removably secure the clamp 50 to the clamp base 40 in a way that the top most ridge 56 is positioned above the rail to prevent the handle assembly from being removed from the rifle.

Figure 10A:
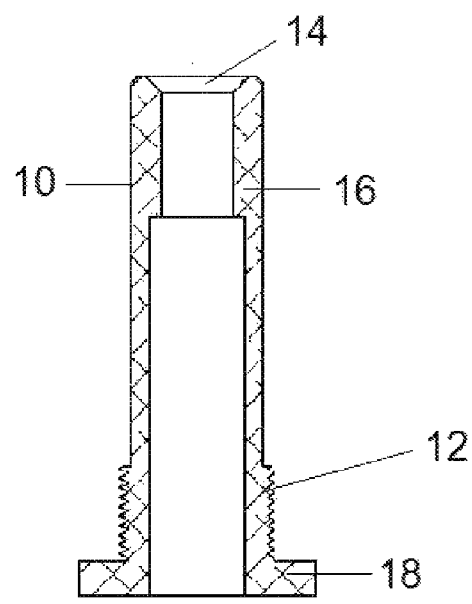
FIG. 10A is a cutaway side view of the friction pin.
Figure 10B:
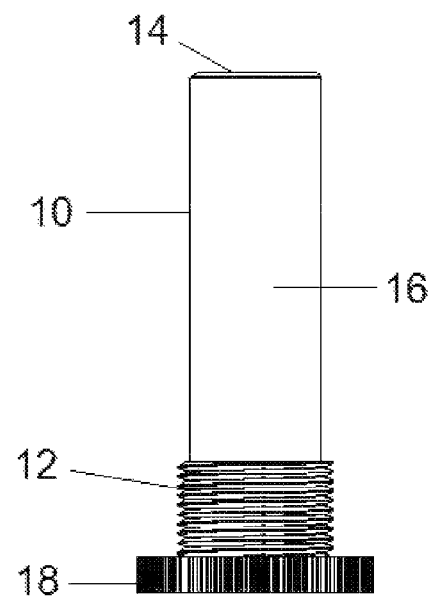
FIG. 10B is a side view of the friction pin.
Figure 10C:
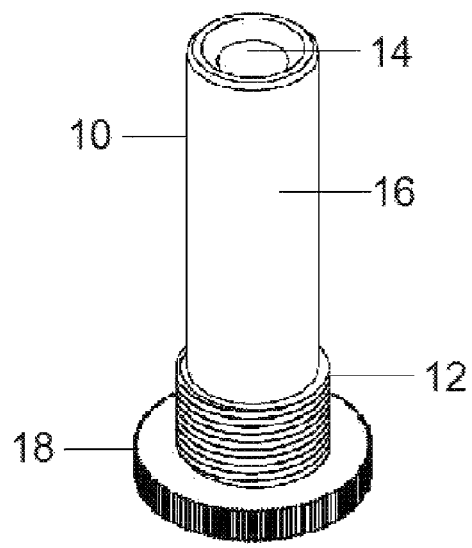
FIG. 10C is a top perspective view of the friction pin.

Referring to FIGS. 10A through 10C the preferred embodiment of the friction pin 10 is displayed. The friction pin 10 is an elongate substantially cylindrical member configured to be received by the internal cavity 34 of the handle 30. The friction pin 10 has a central shaft 16. One end of the friction pin 10 terminates in a ball receiver 14. The ball receiver 14 is a recess in the distal end of the central shaft 16. The ball receiver 14 is configured to come into frictional contact with the ball attachment 20. On the distal end from the ball receiver 14, the friction pin has a grip 18. The grip 18 extends radially from the outer circumference of the friction pin 10. On the lower end of the central shaft 16 is an external threading 12. The external threading 12 is complementary to the internal threading 32 of the handle 30.

The grip 18 provides a means for the user to turn the friction pin 10 radially within the handle 30. As the user turns the friction pin 10 clockwise within the handle 10, the internal threading 32 of the handle 30 pulls the external threading 12 of the friction pin 10 inward into the internal cavity 34. This causes the shaft 16 of the friction pin 10 to move inward within the internal cavity 34 and press the ball receiver 14 against the ball 22. The user can rotate the friction pin 10 to a sufficient degree that the ball receiver 14 presses against the ball 22 to the point that the frictional force present cannot be overcome and the handle is substantially locked into place. If a user desires to change the position of the handle 30, the user rotates the friction pin 10 in a counter clockwise manner. This causes the internal threading 32 of the handle 30 to push the external threading of the friction pin 10 outward from the internal cavity 34. This causes the shaft 16 of the friction pin 10 to move outward, relieving the pressure of the ball receiver 14 against the ball 22. The user may then rotate the handle 30 into any desired position. The user may rotate the handle into any desired position in line with the longitudinal axis of the firearm. Alternatively, the user may rotate the handle 30 into any desired position radially on the ball attachment 20. The user may position the handle 30 at an oblique angle out of line with the longitudinal axis of the firearm. The user then reengages the friction pin 10 to the ball attachment to lock the handle 30 in the position.

Figure 11A:
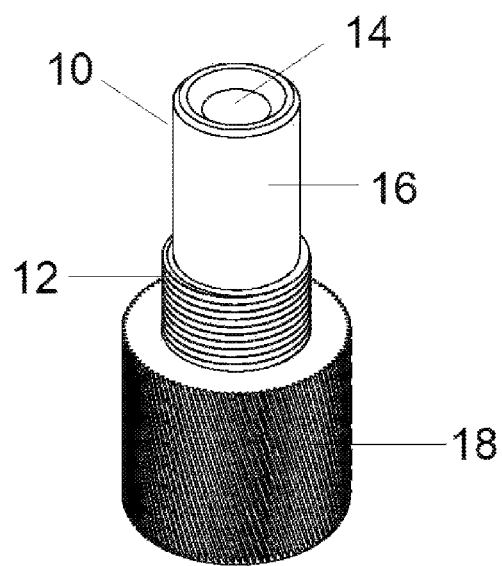
FIG. 11A is a top perspective view of an alternative embodiment of the friction pin.
Figure 11B:
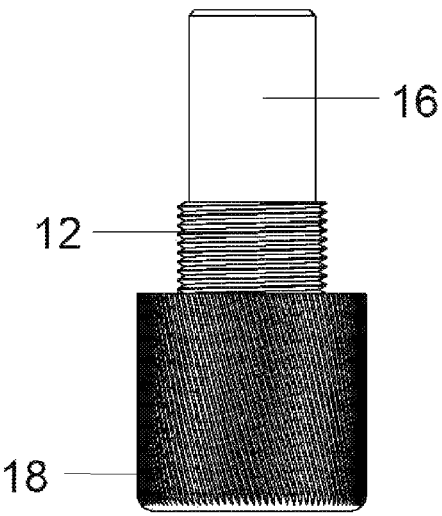
FIG. 11B is a side view of an alternative embodiment of the friction pin.
Figure 11C:
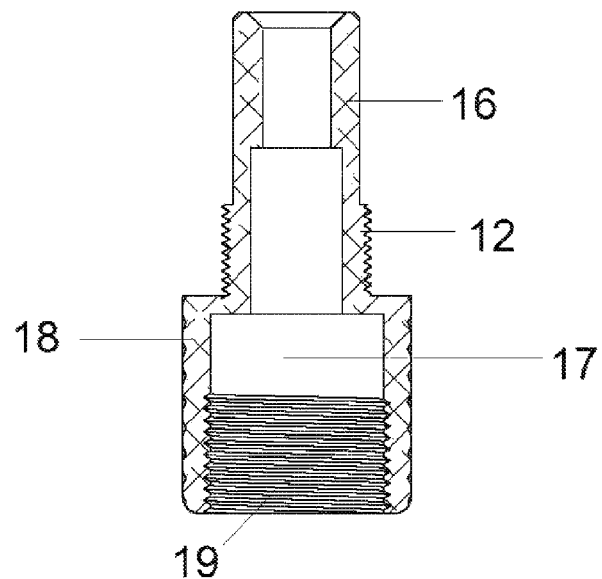
FIG. 11C is a cutaway side view of an alternative embodiment of the friction pin.

Referring to FIGS. 11A through 11C, and alternative embodiment of the friction pin 10 is displayed. In the alternative embodiment of the friction pin 10 the friction pin 10 comprises a shaft 16, with a ball receiver 14 and an external threading 12. In the alternative embodiment the friction pin 10 has an elongated grip 18. The elongated grip 18 has an internal cavity 17. The internal cavity 17 is a hollow space configured to receive an end cap 80. The internal cavity 17 is formed by a circular opening in the lower end of the friction pin 10. At the lower end of the internal cavity 17 is an internal threading 19. The internal threading 19 is disposed around the internal circumference of the internal cavity 17.

Figure 12A:
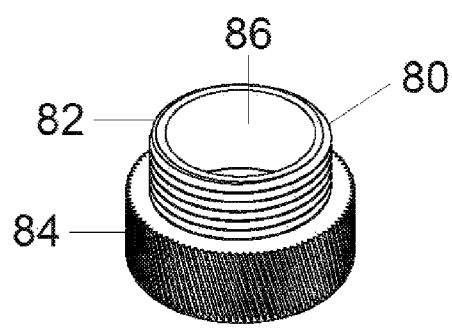
FIG. 12A is a top perspective view of the end cap.
Figure 12B:
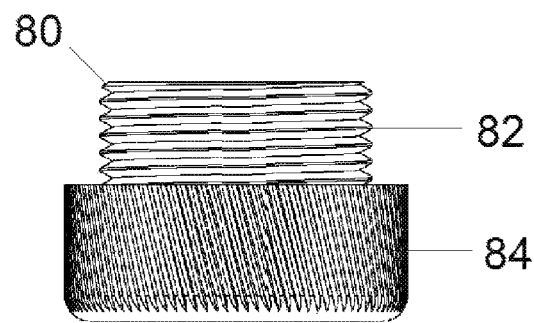
FIG. 12B is a side view of the end cap.
Figure 12C:
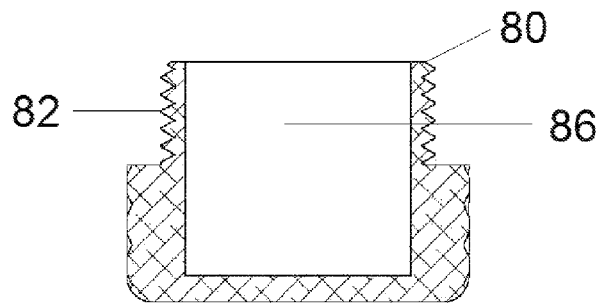
FIG. 12C is a cutaway side view of the end cap.

Referring to FIGS. 12A through 12C the preferred embodiment of the end cap 80 is illustrated. The end cap 80 has an end cap cavity 86 for the storage of personal effects and items within the friction pin 10 while using the firearm. The end cap cavity 86 may be any size, shape, and dimension. The end cap 80 has an external threading 82 complementary to the internal threading 19 of the internal cavity 17 of the friction pin 10. At the lower end of the end cap 80 is an end cap grip 84. The end cap grip 84 can be any size and shape but in the preferred embodiment the end cap grip 84 is circular and coextensive with the outer circumference of the grip 18 of the friction pin 10.

To utilize the storage in the end cap 80, a user places an item in the end cap cavity 86. The user then places the external threading 82 of the end cap 80 within the internal threading 19 of the friction pin 10. The user holds the end cap grip 84 and rotates the end cap 80 axially, securing the end cap 80 to the friction pin 10. To remove the item from storage in the end cap cavity 86, the user grasps the end cap grip 84 and rotates the end cap 80 axially in an opposite direction to disengage the external threading 82 of the end cap 80 from the internal threading 19 of the friction pin 10.

In the preferred embodiment, the handle assembly may be removably secured to the Picatinny rail. A Picatinny mounting rail is typically placed in a parallel orientation to a weapon's receiver or barrel, or can be incorporated into a long arm's stock or a pistol frame. Accessories are typically clamped or attached to the rail by a combination of rigid and clamping members, affixed by screws, bolts, thumbscrews and/or cam levers that index into transverse slots that repeat for the length of the rail at a precise uniform spacing. A Picatinny rail, which is also sometimes called a tactical rail, is a standard bracket that is used on some firearms that provides a standardized mounting platform for accessories. Picatinny rails are used on many different types of firearms and were originally designed for mounting scopes. However, the rails are useful for mounting any number of different types of accessories, including but not limited to accessories such as optics, sighting telescopes, laser aiming modules, thermal imaging devices, night vision devises, knives, cameras, flashlights, foregrips, bipods, bayonets, and the like. The rail is a longitudinal member that is mounted to the weapon. The rail includes opposed side edges with a specific configuration and a series of ridges extending transverse to the longitudinal axis of the member; each ridge is separated from adjacent ridges with a spacing slot. The rails typically have very standardized size and spacing specifications.

In another embodiment the swivel handle assembly is permanently attached to the forward rail of a firearm. In this embodiment the forward rail of the firearm is manufactured to have a ball attachment 20 permanently connected to the forward rail. In this embodiment the ball attachment 20 would not have any ball attachment external threading 28. Also the swivel handle assembly would comprise solely the ball attachment 20, handle 30, and friction pin 10.

The components of the swivel handle assembly may be made from any type of material, such as a metal or a thermoplastic. Any external coverings for the swivel handle assembly, including but not limited to the sleeve fitting over the external surface of the handle 30 may be made from any type of material. In the preferred embodiment, external coverings will be composed of rubber, synthetic rubber, an elastomer, leather, fabric, or any other type of material used for an external covering.

In the preferred embodiment the swivel handle assembly is utilized for a firearm. However, in other embodiments of the invention the swivel handle assembly can be used for any device. For instance, the swivel handle assembly may be attached to a hose or a firehose to permit a user to hold the hose while in use. Alternatively the swivel handle assembly may be used on a tool, such as a drill, or a gardening device such as a mower. The swivel handle assembly may be attached to steering wheels or columns for the operation of a vehicle. The swivel handle assembly may be utilized on any device, tool, or component, which a user must grip and hold to utilize or carry. The swivel handle assembly may be utilized as an accessory to an existing device, configured to be removed and attached at will by the user. Alternatively, the swivel handle assembly may be permanently attached to the device at the original point o manufacture.

The above description of disclosed embodiments is provided to enable any person skilled in the art to make or use the invention. Various modifications to the embodiments will be readily apparent to those skilled in the art, the generic principles defined herein can be applied to other embodiments without departing from spirit or scope of the invention. All references cited are hereby incorporated by reference herein in their entireties and made part of this application. The invention is not intended to be limited to the embodiments shown herein but is to be accorded the widest scope consistent with the principles and novel features disclosed herein.

What has been described above includes examples of the claimed subject matter. It is, of course, not possible to describe every conceivable combination of components or methodologies for purposes of describing the claimed subject matter, but one of ordinary skill in the art can recognize that many further combinations and permutations of such matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A movable handle assembly comprising
    a. A ball attachment
        i. Said ball attachment comprising a generally spherical ball and a connection member wherein said connection member is extends radially from the generally spherical ball and wherein said connector member of said ball attachment is a substantially cylindrical member having two planar recesses positioned on substantially opposite sides of said connector member;
    b. A handle
        i. Said handle being a substantially cylindrical elongate member having a first end and a second end;
        ii. Said handle having an internal cavity extending from said first end to said second end;
        iii. Said first end having an internal threading on the inner circumference of said internal cavity;
        iv. Said first end having a first end opening, said first end opening being substantially circular;
        v. Said second end having a second end opening
            1. Said second end opening being substantially circular in shape;
    c. A friction pin
        i. said friction pin having a substantially cylindrical member terminating in a first end and a second end;
        ii. said friction pin comprising
            1. a grip, said grip located at said second end of said friction pin and extending radially from the outer circumference of said friction pin;
            2. external threading, said external threading extending radially from the outer circumference of said friction pin, said external threading located proximal to said second end of said friction pin and distal to said first end of said friction pin;
    d. wherein said generally spherical ball of said ball attachment is located within the internal cavity of said handle and proximate to said second end of said handle with said connection member extending through said second end opening of said handle
        i. wherein said connection member is movable within said second end opening of said handle;
    e. wherein said substantially cylindrical member of said friction pin extends through said internal cavity of said handle such that said first end of said friction pin is proximate to said generally spherical ball of said ball attachment;

f. wherein said friction pin may be rotated axially within said internal cavity of said handle;
g. wherein when said external threading of said friction pin engages said internal threading of said handle when said friction pin is rotated axially, said friction pin moves along the longitudinal axis of said handle;
h. wherein said first end of said friction pin may contact said generally spherical ball with sufficient force to lock said handle in a fixed position on said ball attachment.

2. The handle assembly as in claim 1
a. Wherein said second end opening of said handle further comprises a notch extending longitudinally from the second end opening toward said first end of said handle.

3. The handle assembly as in claim 1
a. Wherein said first end of said friction pin comprises a substantially hemispherical depression.

4. The handle assembly as in claim 1 further comprising
a. A sleeve encircling the outer circumference of said handle, wherein said sleeve is composed of a material selected from a group consisting of: rubber, synthetic rubber, elastomer, leather, and fabric.

5. The handle assembly as in claim 1
a. Wherein said handle has a plurality of circular ridges on the external circumference of said handle.

6. The handle assembly as in claim 1 further comprising
a. An end cap
   i. Said end cap having a substantially cylindrical member terminating in a first end and a second end;
   ii. Said end cap comprising
      1. A grip, said grip located at said second end of said end cap and extending radially from the outer circumference of said friction pin;
      2. External threading, said external threading extending radially from the outer circumference of said end cap, said external threading located at said first end of said end cap;
      3. An internal cavity extending longitudinally from said first end of said end cap into the body of said end cap;
b. Wherein said friction pin further comprises
   i. An internal cavity, said internal cavity extending longitudinally from said second end of said friction pin, said internal cavity having an internal threading complementary to said external threading of said end cap;
c. Wherein said end cap may be removably secured to said friction pin.

7. The handle assembly as in claim 2
a. Wherein said first end of said friction pin comprises a substantially hemispherical depression.

8. The handle assembly as in claim 7 further comprising
a. A sleeve encircling the outer circumference of said handle, wherein said sleeve is composed of a material selected from a group consisting of: rubber, synthetic rubber, elastomer, leather, and fabric.

9. The handle assembly as in claim 7
a. Wherein said handle has a plurality of circular ridges on the external circumference of said handle.

10. The handle assembly as in claim 9 further comprising
a. An end cap
   i. Said end cap having a substantially cylindrical member terminating in a first end and a second end;
   ii. Said end cap comprising
      1. A grip, said grip located at said second end of said end cap and extending radially from the outer circumference of said friction pin;
      2. External threading, said external threading extending radially from the outer circumference of said end cap, said external threading located at said first end of said end cap;
      3. An internal cavity extending longitudinally from said first end of said end cap into the body of said end cap;
b. Wherein said friction pin further comprises
   i. An internal cavity, said internal cavity extending longitudinally from said second end of said friction pin, said internal cavity having an internal threading complementary to said external threading of said end cap;
c. Wherein said end cap may be removably secured to said friction pin.

11. A movable handle assembly for a firearm comprising
a. a clamp base
   i. said clamp base having a top side and a bottom side, wherein said bottom side has a ball attachment receiver, said ball attachment receiver having a central opening for receiving said connection member of said ball attachment;
   ii. said top side of said clamp base having one or more bolt receptors passing transverse to the longitudinal axis of said clamp base and configured to receive one or more bolts;
   iii. said top side of said clamp base having an upper member extending along the longitudinal edge of said clamp base, said upper member having a notch extending within said upper member and extending longitudinally in said upper member;
   iv. Said upper member having one or more bolt receptor holes configured for receiving one or more bolts;
   v. Said top side of said clamp base having a central recess configured for receiving a threaded nut;
b. a clamp
   i. wherein said clamp has a longitudinal recess located between a top longitudinal ridge and a bottom longitudinal ridge;
   ii. wherein said clamp has one or more holes in the body of said clamp configured to receive one or more bolts;
c. A ball attachment
   i. Said ball attachment comprising a generally spherical ball and a connection member wherein said connection member is extends radially from the generally spherical ball and wherein said connector member of said ball attachment is a substantially cylindrical member having two planar recesses positioned on substantially opposite sides of said connector member;
d. A handle
   i. Said handle being a substantially cylindrical elongate member having a first end and a second end;
   ii. Said handle having an internal cavity extending from said first end to said second end;
   iii. Said first end having an internal threading on the inner circumference of said internal cavity;
   iv. Said first end having a first end opening, said first end opening being substantially circular;
   v. Said second end having a second end opening
      1. Said second end opening being substantially circular in shape;

e. A friction pin
  i. said friction pin having a substantially cylindrical member terminating in a first end and a second end;
  ii. said friction pin comprising
    1. a grip, said grip located at said second end of said friction pin and extending radially from the outer circumference of said friction pin;
    2. external threading, said external threading extending radially from the outer circumference of said friction pin, said external threading located proximal to said second end of said friction pin and distal to said first end of said friction pin;
f. wherein said generally spherical ball of said ball attachment is located within the internal cavity of said handle and proximate to said second end of said handle with said connection member extending through said second end opening of said handle
  i. wherein said connection member is movable within said second end opening of said handle;
g. wherein said substantially cylindrical member of said friction pin extends through said internal cavity of said handle such that said first end of said friction pin is proximate to said generally spherical ball of said ball attachment;
h. wherein said friction pin may be rotated axially within said internal cavity of said handle;
i. wherein when said external threading of said friction pin engages said internal threading of said handle when said friction pin is rotated axially, said friction pin moves along the longitudinal axis of said handle;
j. wherein said first end of said friction pin may contact said generally spherical ball with sufficient force to lock the handle in a fixed position on said ball attachment.

12. The handle assembly as in claim 11
a. Wherein said connection member has an external threading;
b. Wherein said central opening of said clamp base has an internal thread which is complementary to said external threading of said connection member.

13. The handle assembly as in claim 12 further comprising
a. one or more bolts for removably securing said clamp to said clamp base.

14. The handle assembly as in claim 13 further comprising
a. A threaded nut;
b. Wherein said threaded nut may be removably secured to said external threading of said connection member.

15. The handle assembly as in claim 14 further comprising
a. A sleeve encircling the outer circumference of said handle, wherein said sleeve is composed of a material selected from a group consisting of: rubber, synthetic rubber, elastomer, leather, and fabric.

16. The handle assembly as in claim 14
a. Wherein said handle has a plurality of circular ridges on the external circumference of said handle.

17. The handle assembly as in claim 11 further comprising
a. An end cap
  i. Said end cap having a substantially cylindrical member terminating in a first end and a second end;
  ii. Said end cap comprising
    1. A grip, said grip located at said second end of said end cap and extending radially from the outer circumference of said friction pin;
    2. External threading, said external threading extending radially from the outer circumference of said end cap, said external threading located at said first end of said end cap;
    3. An internal cavity extending longitudinally from said first end of said end cap into the body of said end cap;
b. Wherein said friction pin further comprises
  i. An internal cavity, said internal cavity extending longitudinally from said second end of said friction pin, said internal cavity having an internal threading complementary to said external threading of said end cap;
c. Wherein said end cap may be removably secured to said friction pin.

* * * * *